United States Patent [19]

Fischer

[11] 4,429,505
[45] Feb. 7, 1984

[54] FIXING DEVICE FOR FASTENING OBJECTS ON HOLLOW BOARDS

[76] Inventor: Artur Fischer, Weinhalde 34, D-7244 Waldachtal 3, Tumlingen, Fed. Rep. of Germany

[21] Appl. No.: 300,310

[22] Filed: Sep. 8, 1981

[30] Foreign Application Priority Data

Sep. 11, 1980 [DE] Fed. Rep. of Germany ....... 3034129
Oct. 23, 1980 [DE] Fed. Rep. of Germany ....... 3039917
Nov. 8, 1980 [DE] Fed. Rep. of Germany ....... 3042282

[51] Int. Cl.³ .............................................. E04C 1/16
[52] U.S. Cl. ...................................... 52/583; 52/587; 248/220.3; 248/221.1
[58] Field of Search ................. 52/787, 713, 483, 489, 52/579–584, 585, 586, 580, 583, 582, 587; 248/220.4, 220.3, 221.1, 221.2; 211/90

[56] References Cited

U.S. PATENT DOCUMENTS

| 239,909 | 4/1881 | Woodward | 108/152 |
|---|---|---|---|
| 3,209,919 | 10/1965 | Hoogstoel | 211/90 |
| 3,269,550 | 8/1966 | Marcus | 248/221.1 |
| 3,289,992 | 12/1966 | Brooks | 248/220.3 |
| 3,718,101 | 2/1973 | Sacks | 248/221.1 |
| 3,844,231 | 10/1974 | Peacock | 248/220.4 |
| 4,292,779 | 10/1981 | Landheer | 52/489 |
| 4,319,531 | 3/1982 | Caldwell | 248/220.4 |

FOREIGN PATENT DOCUMENTS

| 2639552 | 3/1978 | Fed. Rep. of Germany | 52/713 |
|---|---|---|---|
| 1084577 | 7/1954 | France | 248/220.3 |
| AD.66717 | 3/1957 | France | 248/221.2 |
| 1226018 | 2/1960 | France | 248/221.2 |

Primary Examiner—James L. Ridgill, Jr.
Attorney, Agent, or Firm—Michael J. Striker

[57] ABSTRACT

Disclosed is a fixing device for connecting objects to a hollow board having a plurality of spaced cells defined by transversely spaced first and second panels which are joined to one another through a plurality of spaced webs therein between. The fixing device comprises a connecting member for fastening objects thereto and at least one elongated support member for disposing within the boards. The support member is provided with first and second opposed ends and the connecting member is arranged substantially perpendicular to one of the opposed ends, whereby a pull-out force acting on the connecting member due to the objects supported thereby is substantially received by the supporting member when the device is disposed in the board.

6 Claims, 8 Drawing Figures

FIXING DEVICE FOR FASTENING OBJECTS ON HOLLOW BOARDS

BACKGROUND OF THE INVENTION

The present invention relates generally to fasteners, and pertains more specifically to a fixing device for fastening objects on a hollow board.

Hollow boards are often used for the construction of green houses. They are typically formed from transparent plastic materials, such as for example polypropylene, polycarbonate, etc., and usually comprise a pair of transversely spaced upper and lower external boom panels, which are joined to one another through a plurality of internal webs or ribs. The ribs are equally spaced therein between so as to define a network of internal hollow cells.

The needs of greenhouse often require various objects to be attached to the hollow board thereof, such as for example, pipes, cables, wire, etc. Sometimes a need arises to connect two or more boards together or to support a butt connection between the boards. In some instances, a hollow board will need to be attached to a supporting structure. These needs are usually satisfied with fixing devices. A fixing device is normally imbedded into the outer panels or skin of the board and the object is fastened to the device.

A common problem involved with attaching fixing devices to hollow boards is that their outer panels are often damaged as the fixing device is being embedded therein. In some instances, the damage may be severe enough to cause an undesirable amount of leakage. Such damage usually occurs because the boards are generally fairly thin and the cell height between the pabels is usually fairly shallow.

Dowell-type fixing devices have been used in an attempt to overcome this problem. However, in some applications may dowel-type fixing devices are also unsuccessful in preventing an undesirable amount of damage because of the thinness of the panels and the shallow height of the cells.

Against the foregoing background, it is an object of the present invention to provide a fixing device for satisfactorily fastening objects on hollow boards without causing an undesireable amount of damage to the boards during insertion of the device or some time thereafter.

It is another object to provide a fixing device for fastening objects on a hollow board, which device comprises at least one support member for disposing within the board and a connecting member for fastening objects thereto, wherein the connecting member is arranged substantially perpendicular to the support member such that a bearing surface defined by the support member substantially receives a pull-out force acting on the connecting member due to the objects fastened thereto.

It is a further object to provide a fixing device for fastening objects on a hollow board which device comprises a plurality of support members arranged with a connecting member so as to allow substantially heavy loads to be suspended from the attached device.

It is still another object to provide a fixing device for fastening objects to hollow boards, which device comprises a connecting member having a through aperture adapted for attaching the various objects thereat.

It is yet another object to provide a fixing device for forming a butt joint of two hollow boards which are disposed adjacent one another such that the cells of the boards are arranged in parallel.

It is yet and still another object to provide a fixing device for forming a butt joint or two hollow boards which are disposed adjacent one another such that the cells of the boards are arranged in a longitudinally extending straight line.

It is yet and still another object to provide a fixing device for satisfactorily fastening a hollow board to a supporting structure such as an angular support and cross-ties.

It is yet and still a further object to provide a fixing device for fastening objects to a hollow board having a plurality of support member with spatular-shaped bearing surfaces and a connecting member with a plurality of raised contact surfaces, such that attachment of the device to the board wedges one of the board's two panels between the bearing surfaces and the contact surfaces so as to allow compressive forces derived from objects attached to the device to be substantially received by such bearing surfaces and to allow tensile forces derived from the attached objects to be substantially received by the contact surfaces.

SUMMARY OF THE INVENTION

To the accomplishment of the foregoing objects and advantages, the present invention in brief comprises a fixing device for connecting objects to a hollow board, the board having transversally spaced first and second outer panels and a plurality of spaced ribs therebetween, the fixing means comprising: a connecting member for fastening objects thereto, and a support member for inserting into a cell defined by the arrangement of ribs and panels, the support member having first and second opposed ends and the connecting member being arranged perpendicularly to one of the opposed ends, such that a pull out force acting on the connecting member due to objects supported thereby are substantially received by the supporting member when the device is disposed on the board.

The invention will be more fully understood, while still further objects and advantages thereof will become apparent, in the following detailed description of preferred embodiments of the invention illustrated in the accompanying drawings wherein:

DESCRIPTION OF THE PREFERRED EMBODIMENTS

Figure 1:
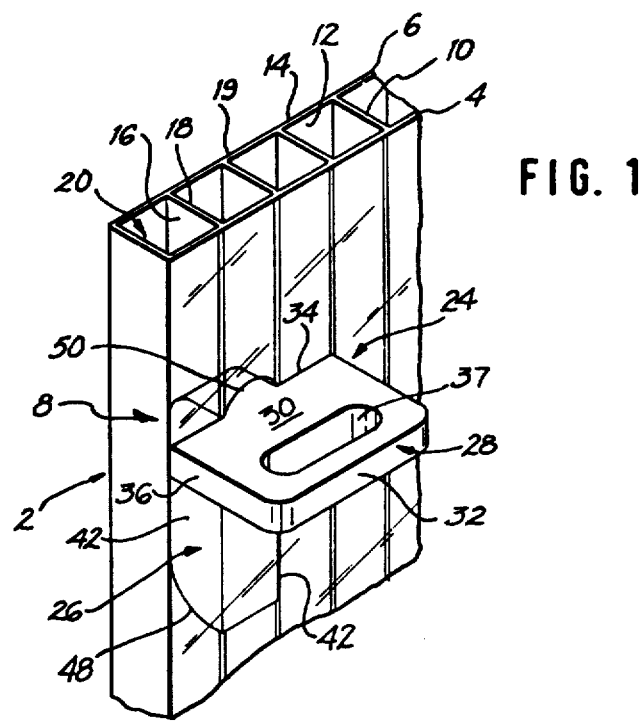
FIG. 1 is a fragmentary perspective view of a hollow board employing one embodiment of the fixing device of the present invention having a support member inserted within a hollow board and a connecting member extending therefrom.

Referring now to the drawings, and especially to FIG. 1 thereof, a hollow board, generally denoted by the reference numeral 2, is illustrated. Board 2 is of a type typically employed in the construction of greenhouses. In greenhouses, boards 2 are often used to removeably fasten thereto various objects such as pipes and cables. Two or more boards may also require joining or support at a butt connecting thereof. In some instances, board 2 may need to be suspended from a supporting structure.

Boards 2 typically comprise an outer skin in the form of transversely spaced lower and upper external boom panels 4, 6, respectively, two end ribs or webs, generally denoted by the reference numeral 8, of which only one is shown for the sake of clarity and simplicity, and a plurality of parallel spaced internal webs 10 extending between end ribs 8. Each panel 4, 6 comprises opposed inner and outer side surfaces 12, 14, respectively. Similarly, end webs 8 and internal ribs 10 comprise inner and outer opposed side surfaces 16, 18, respectively.

Webs 8 and 10 extend in a longitudinal direction between open end sides 19 of which only one is shown for the sake of clarity and simplicity. Webs 8, 10 function to join panels 4, 6 to one another, as well as function to form a plurality of hollow cells or compartments which are generally denoted by the reference character 20. Cells 20 are equally spaced between end ribs 8 and extend longitudinally between the open end sides 19 as is clearly shown in FIG. 1.

In accordance with the invention a fixing device, generally denoted by the reference character 24, is embedded into board 2 in a manner to allow objects to be fastened thereto. Device 24 comprises a support member 26 and a connecting member in the form of a fixing lug 28. Fixing lug 28 comprises a generally rectangular plate-like shape having opposed end side surfaces 30, upper and lower side surfaces 32, 34, respectively, and lateral end side surfaces 36. Fixing lug 28 is arranged or formed substantially perpendicular with one end of support member 26 so as to provide fixing device 24 with a sort of hook-like or spade-like configuration. To obtain this configuration, fixing lug 28 lies in a transverse plane that is substantially perpendicular to a longitudinal extending plane defined by support member 26. Fixing lug 28 is also provided with a through slot or aperture 37 for fastening objects thereto when device 24 is attached to board 7.

Figure 2:
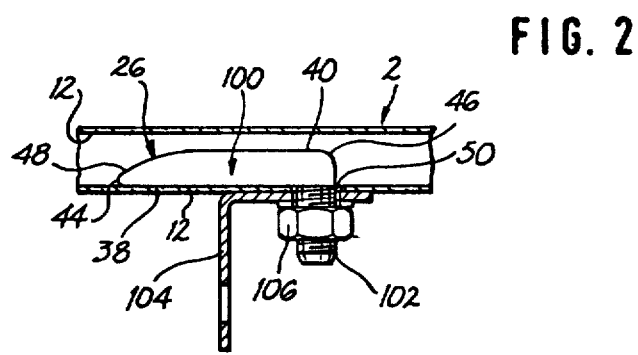
FIG. 2 is a fragmentary side view of a hollow board employing a varient of the connecting member of the fixing device of FIG. 1.

Support member 26 comprises generally an elongated bar-like shape, having top and bottom side surfaces 38, 40, respectively, lateral side surfaces 42, and end sides 44, 46, which latter features are most clearly shown in FIG. 2. The top side 38 of member 26 defines a bearing surface and its bottom surface is provided with a chamfer 48, which will be more fully discussed hereinafter. The chamfer 48 is also most clearly shown in FIG. 2.

To attach fixing device 24 to hollow board 2, first a through aperture 50 is formed in one of the two panels 4, 6, usually the lower panel 4. Next, the support member 26 is inserted through aperture 50 and into the cell communicating therewith. To allow such an insertion, the dimensions of aperture 50 is made to correspond with the outer dimensions of support member 26. To accomplish the insertion, support member 26 is positioned adjacent board 2 such that its longitudinal axis is aligned with aperture 50. Upon alignment, support member 26 is inserted through aperture 50 with a circular motion. From the foregoing it will now be apparent that the chamber 48 is provided to facilitate the insertion.

The inserted member 26 is disposed within cell 20, such that its bearing surface 38 rests fairly flush with the inner surface 12 of lower panel 4 and its longitudinal axis extends in a longitudinal direction between open ends 19 of board 2, as is most clearly shown in FIG. 1. Additionally, it will be noted that support member is formed such that the distance or height between its top and bottom sides 38, 40 is approximately equal to the distance between the inner confronting surfaces 12 of the two panels. Additionally, the distance or width between lateral sides 42 of member 26 is slightly smaller than the distance between adjacently positioned webs 10.

From the foregoing it will be appreciated that upon inserting of support member 26 within cell 20 as aforesaid, a pull-out force acting on fixing lug 28 due to objects fastened thereto is substantially received by the bearing surface 38 of support member 26. It will be further appreciated that chamfer 48 facilitates insertion of support member 26 into cell 20, as aforesaid, without reducing the bearing surface 38.

Referring again to FIG. 2, there is illustrated a varient of the embodiment of FIG. 1. The difference between the embodiment of FIG. 1 and FIG. 2 is that the fixing device of FIG. 2, denoted by the reference character 100, comprises a connecting member in the form of a threaded fastener or bolt 102. It will be understood that elements of the hollow board 2, the fixing device 100, etc., illustrated in FIG. 2, as well as in other Figures, with reference characters that are identical to the reference characters illustrated in FIG. 1, are identical to one another. Referring again to fixing device 100, it will also be understood that support member 26 of device 100 is inserted and disposed within cell 20 in substantially the same manner as that described for the fixing device 24 in the embodiment of FIG. 1. However, with regard to device 100, upon such an insertion of support member 26 the threaded fastener 102 is preferably employed to secure an angle section 104 thereto. A nut 106 is used for the latter purpose. It will be apparent that angle section 104 may be used to fasten a number of various types of objects to board 2.

Figure 3:
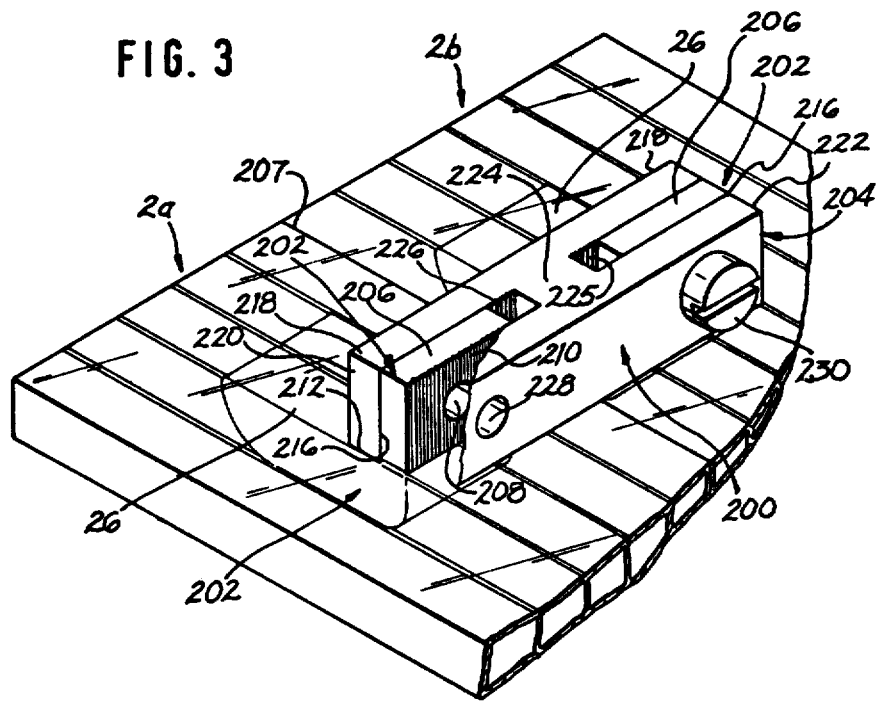
FIG. 3 is a fragmentary perspective view of a hollow board employing another embodiment of a fixing device of the present invention for forming a butt joint of two hollow boards being disposed adjacent one another such that the cells of each board are arranged in parallel.

Referring now to FIG. 3, there is illustrated another embodiment of a fixing device, generally denoted by the reference character 200, for forming a butt joint of two hollow boards 2a, 2b, which are disposed adjacent one another such that their cells 20a, 20b are arranged in parallel. Fixing device 200 may be regarded as an assembly which comprises a pair of fixing devices 202 and a T-shaped connector 204.

Each device 202 of assembly 200 is provided with a connecting member 206 substantially similar in structure to the fixing lug 28 of the embodiment of FIG. 2, except for the difference that apertures 208 of connecting members 206 are adapted to receive bolts or screw-type fasteners therein, as will be more fully explained herein after. Another difference is that the opposed outer surfaces 210 of connecting member 206 are provided with grooves 212 which abuttingly engage similar grooves defined by the T-shaped connector 204, as will also be more fully explained hereinafter.

Each connecting member 206 is formed with a support member 26 so as to extend perpendicularly therefrom in the same manner as described hereinabove in connection with the embodiment of FIG. 1. However, each connecting member 206 of assembly 200 is preferably provided with at least two or more support members 26. Utilizing a plurality of support members 26 distributes the load to several members 26 and thus to several cells 20. Such a distribution of the load allows the suspension of substantially heavy loads on assembly 200.

T connector 204 has a general elongated bar-like shape. Connector 204 is formed so as to allow it to mate with the two connecting members 206, subsequent to insertion and to allow them to be connected. To achieve such a mating, connector 204 is provided with a pair of prongs or legs 218. Each leg extends in a given direction parallel to the other between opposite edges side end 220, 222. Legs 218 are spaced apart transversely and a web 224 interconnects legs 218 so as to define a pair of slots 216, one for each side end 220, 222. Each one of the two slots 216 function to receive a corresponding connecting member 206 of devices 202.

The inner confronting surfaces of the two slots 216 may be provided with grooves or corrugations 226 abuttingly engaging the corrugations 212 of the two connecting members 206. Contact between the corrugations of the slots 216 and members 206 will occur when connector 204 is employed to join the two devices 202, as will be more fully explained hereinafter. Additionally, legs 218 are provided with a pair of through apertures 228, one for each end side 220, 222. Each aperture 228 is positioned intermediate web 224 and the end side 220 or 222 associated therewith, such that each aperture 228 is aligned with a corresponding aperture 208 of the connecting member, when connector 204 is employed to join devices 202.

To connect boards 2a, 2b to one another with assembly 200, a first one of the two devices 202 is inserted into board 2a and the remaining device is inserted into board 2b. To effect insertion, aperatures 50 are first formed within the lower panels of boards 2a, 2b so as to allow the support members 206 to be inserted therethrough in substantially the same manner as described for the insertion of support member 26 of the embodiment of FIG. 1.

Upon completing insertion, the support members 206 will be arranged in parallel at a distance from one another which corresponds to the spacing or distance defined by the cells of boards 2a, 2b. Additionally, the connecting members 206 of each device 202 will be positioned at right angles with respect to the support members 26. Moreover, support members 26 will be aligned with respect to one another such that they lie in a straight line, which line extends substantially perpendicular to a longitudinally extending line defined by the junction 207 between the adjacently positioned boards 2a, 2b.

Connector 204 is next placed onto the aligned connecting members 206 to effect connecting the devices to one another, and thus fasten the boards 2a, 2b together. To allow fastenings, the slots 216 are mated with corresponding ones of the two connecting members 206 such that the apertures 208 and 228 of the members 206 and slots 216, respectively, are in alignment. Appropriate threaded-type fasteners or nut and bolt-type fasteners 230 are then inserted into apetures 208, 228 to secure the joined support members 206.

From the foregoing it will be appreciated that the aforesaid attached assembly provides a tension-proof connection of the hollow boards 2a, 2b in a manner to substantially minimize bucking of the boards 2a, 2b in the region of the butt joint 207. It will be further appreciated that the grooved outer surfaces 210 of connecting member 206 and the grooved inner confronting surfaces 225 of slots 216 substantially increase stability.

Figure 4:
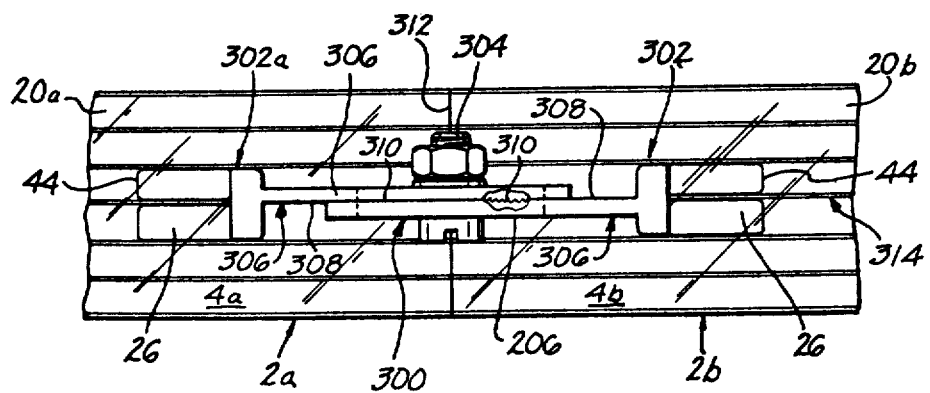
FIG. 4 is a fragmentary top of a hollow board employing another embodiment of a fixing device of the present invention for forming a but joint of two hollow boards being disposed adjacent one another such that the cells of each board are arranged in a longitudinally extending straight line.

Referring now in FIG. 4, there is illustrated another embodiment of a fixing device, generally denoted by the reference character 300, for forming a butt joint of two hollow boards 2a, 2b, which are disposed adjacent one another such that their cells 20a, 20b are arranged to extend in a longitudinally extending straight line. This fixing device also comprises an assembly having a pair of fixing devices 302 and a threaded or nut-and-bolt type fastening member 304. It is to be noted, assembly 300 is substantially similar to assembly 200 of the embodiment of FIG. 3.

One difference between the two concerns the support members. In addition to each one of the plural support members 26 being formed substantially perpendicular to the two connections member 306 associated therewith, they are also formed to lie in a straight line. In this straight line configuration the support members 26 and the connecting members 306 for each one of the two devices 302 are positioned directly opposite one another. Another difference is that the two devices 302 are adapted to be directly connected to one another via fastener 304.

To allow such a connection, the two connecting members 306 are formed to mate with one another in an overlapping manner. To the achievement of this objective, the connecting members 306 are also constructed somewhat differently than the connected members 206 of the embodiment of FIG. 3, in that the thickness of their inner mating surfaces 308 have been diminished, as is most clearly shown in FIG. 4. Additionally, the mating surfaces 308 are preferably provided with a grooved or corrugated configuration 310 so as to increase friction therebetween upon mating.

Upon insertion of the plural support members 26 into boards 2a, 2b, one fixing device 302 and the associated support members 26 thereof for one board 2a or 2b, in a manner substantially the same as that described to effect the insertion of support members 26 of the embodiment of FIG. 3, the supporting members 26 will extend in the same longitudinal direction as cells 20a, 20b. Also, the ends 44 of the support members 26, for each one of the two devices 302, will point or extend in diametrically opposite directions. Moreover, insertion of the support members as described, will allow the two connecting members to mate with one another. When mated, the two connecting members 306 will extend towards each other in an overlapping relationship so as to also overlap a transverse extending junction 312 defined by the joined boards 2a, 2b, as well as to overlie a single longitudinally extending web defined by the joined boards 2a, 2b. This web is generally denoted by the reference character 314.

Upon being mated, the two connecting members 306 will also bear against the lower panels 4a, 4b and thus also bear against web 314 therebeneath. The mated connecting members 306 are fastened to one another, and thus boards 2a, 2b are also fastened to one another in a tension-proof connection, with suitable nuts and bolt-type hardware 304 by way of through apertures 208. It being understood that the apertures 208 have been formed within connecting members 306 so as to allow the hardware 304 to be inserted therein upon mating of the members. From the foregoing it will be apparent that when the mated connecting members bear on panel 4a, 4b they are able to substantially prevent bucking in the region of the butt joint thereunder.

Figure 5:
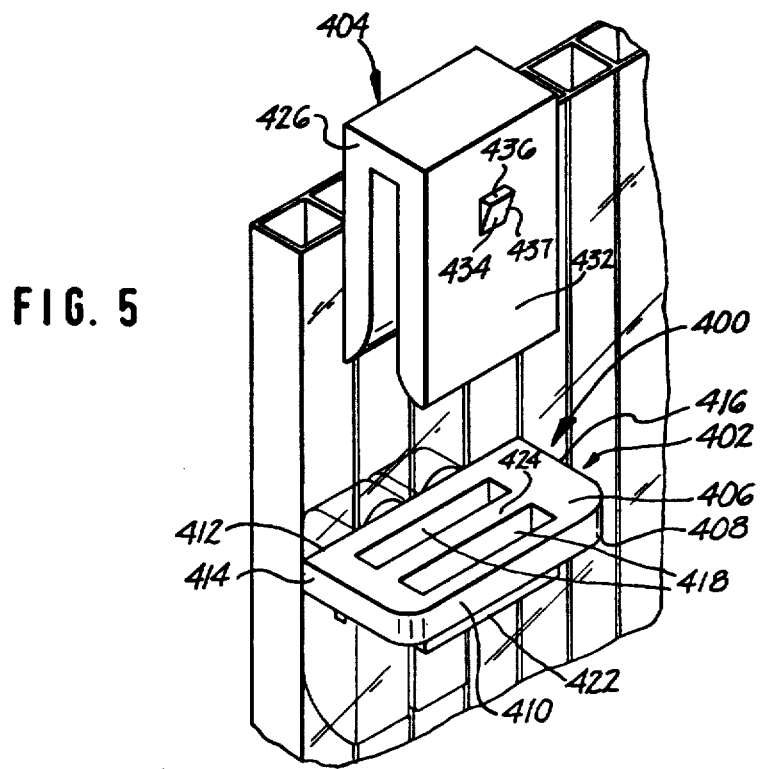
FIG. 5 is a partially exploded, fragmentary perpsective view of a hollow board employing a further embodiment of a fixing device of the present invention for attaching a hollow board to a supporting structure.
Figure 6:
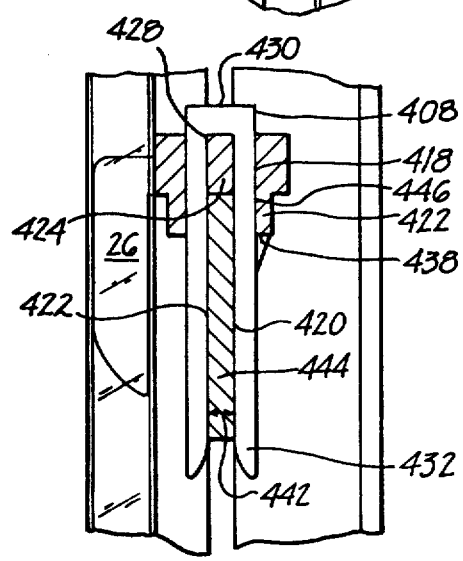
FIG. 6 is a fragmentary side view of a hollow board illustrating the fixing device of FIG. 5 suspended over a cross-tie of a supporting structure.

Referring now to FIGS. 5 and 6, there is illustrated a further embodiment of a fixing device, generally denoted by the reference character 400, for fastening board 2 to a supporting structure, such as, for example, angular supports and cross-ties, or spaced strips arranged on a cross-tie. Fixing device 400 preferably comprises at least two support members 26, a connecting member 402 and a generally U-shaped holding member 404.

Connecting member 402 is provided with a generally flat plate-like shape having opposed upper and lower side surfaces 406, 408, respectively, longitudinally extending sides 410, 412, and transversely extending end sides 414, 416. In a preferred construction, at least two support members 26 are arranged substantially perpendicular to member 402 in substantially the same manner as descibed above in connection with the embodiment of FIG. 1. Upper side 406 is formed substantially planar, in which a parallel pair of longitudinally extending spaced through apertures are provided. In a preferred construction, the through apertures are in the form of rectangularly-shaped slots 418, which are centrally positioned within member 402. Each slot 418 defines inner confronting surfaces 420, 422, as well as a web 424 thereinbetween. Slots 418 are positioned and sized so as to allow mating with holding members 404 as will be more fully described herein after.

Lower side 408 is provided with a parallel pair of longitudinally extending raised ribs 422. Ribs 422 are centrally positioned at side 408 so as to extend in the same longitudinal direction as slots 418. Each one of the two raised ribs 422 defines an inner side surface 424 which is contiguous with a corresponding inner confronting side surface 420 or 422 of the slot 418 associated therewith.

Holding member 404 is formed so as to allow it to mate with connecting member 402 as aforesaid and comprises a fairly flat web member 426 having opposed side surfaces 428, 430. Side 428 define a parallel pair of transversely spaced legs 432, which extend in a given direction perpendicularly therefrom. Legs 432 are provided with a shape and size suitable for mating with slots 418 as is most clearly shown in FIG. 6. In a preferred construction, the legs 432 are provided with a rectangular configuration. It will now be apparent that the rectangular configuration allows the connecting member 402 at side surface 406 to advantageously provide a fairly large area of support for the holding member 404. An outermost leg 432, with respect to lower panel 4, is provided with a locking projection or boss 434. Boss 434 projects from a side surface of the outermost legs so as to define a fairly flat bearing surface 436 as well as to effect locking as will be more fully explained hereinafter. A side surface 437 of boss 434 is inclined as will be apparent the inclination facilitates the mating of holding member 404 and connecting member 402.

To attach board 2 to a supporting structure with device 400, the support members 26 are first disposed within board 2 in a manner substantially similar to that described for the fixing device of the embodiments of FIGS. 1-3. Upon attachment, holding member 404 is matingly connected to connecting member 402 by inserting each leg 432 into a corresponding one of the two slots 418.

The mating will be completed when the lower side surface 428 bears on or abuttingly engages the upper side surface 406 of connecting member 402. When mated, the bearing surface 436 of boss 434 will abuttingly engage a complementary bearing surface 438 defined by the ribs so as to lock the connecting member and the holding member 402, 404, respectively, together. It will be understood that upon locking, the boss in conjunction with the web 424 further functions to prevent or to arrest movement of the holding member 404 with respect to the connecting member 402.

The transverse spacing 442 or distance between the confronting inner side surfaces 440 of legs 432 is chosen to allow board 2 to receive therein between a desired supporting structure. In a preferred application, device 400 is employed with cross ties 444 and the spacing 442 is chosen to allow board 2 to be suspended over the cross-tie 444 of the supporting structure. In such applications, the length of legs 432 are adapted to the width of the cross-ties so as to allow the fixing device to equalize major or thermal expansion of board 2 without getting out of mesh. That is to say, the length of legs 432 are adapted so as to allow them to satisfactorily grip cross-tie 444 even in the case when board 2 has expanded longitudinally due to heat.

From the foregoing, it will be appreciated that fixing device 400 allows boards 2 to be fastened to the supporting structure even if there is no access to cross-ties from inside. This will be the case when it is required to attach the boards to the window panes of the greenhouses to effect thermal insulation. In such applications, board 2 with a fixing device 400 mounted thereon is pressed against the supporting structure, and the holding member is pushed through the slots of the connecting member and over the crossties. It will be further appreciated that boards may be suspended with device 400 even when the legs 432 of the holding member 404 are in parallel with support member 26 and extend beyond them. Additionally, it will be apparent that ribs 422 bear on the outer side surfaces 446 of legs of the holding member 404, during the retention of a supporting structure therein. The latter function of the ribs 422 substantially improves the ability of the device 400 to satisfactorily receive wind pressure loads, and suction forces acting on the hollow boards 2.

Figure 7:
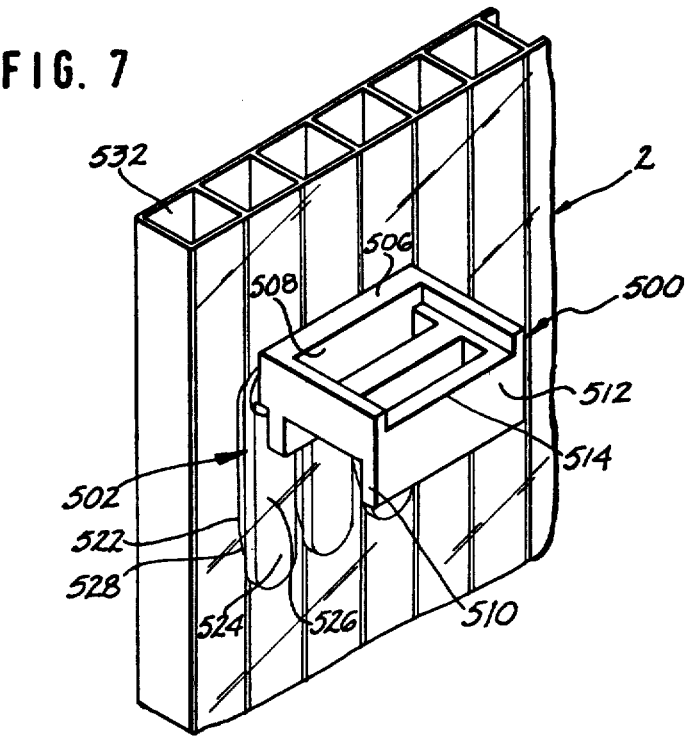
FIG. 7 is a fragmentary perspective view of a hollow board employing still another embodiment of the fixing device of the present invention.
Figure 8:
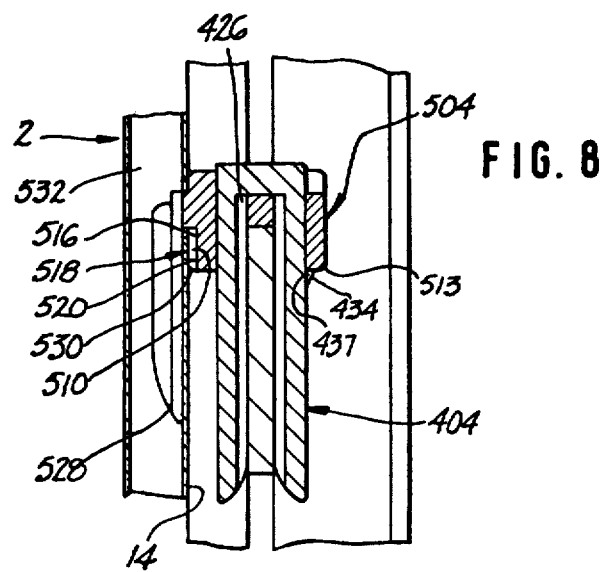
FIG. 8 is a fragmentary side view of a hollow board illustrating the fixing device of FIG. 7.

Referring now to FIGS. 7-8, there is illustrated a still further embodiment of a fixing device, generally denoted by the reference character 500, for fastening a hollow board 2 to a supporting structure. Fixing device 500 preferably comprises a plurality of support members 502, a slotted connecting member 504, and a holding member 404.

Connecting member 504 is a varient of connecting member 402 of the embodiment of FIG. 6. One difference between the two is that the upper surface 506 of member 504 is provided with a rectangularly-shaped recess 508 of a suitable size to substantially receive therein web 426 of holding member 404. Another structural difference is that the outermost raised rib 510 is formed in such a manner that its outer surface 512 is flush with an end edge 514 of the connecting member 504. The top surface 513 of rib 510 defines a bearing surface which matingly engages the bearing surface 437 of boss 434.

The remaining rib 510 defines an offset 516, offset 516 is provided with a plurality of raised ribs 518 on a bearing surface 520 thereof, which surface lies parallel to the outer surface 14 of panel 4. The ribs 518 of offset 517 define or form a plurality of contact surfaces. The ribs or contact surfaces 518 extend along the surface of the offset so as to project over all of the apertures 50 formed in board 2. The distance between the outer extremities of the contact surfaces 518 and the bearing surface 520 is substantially equal to the distance defining the thickness of lower panel 4.

Support members 502 are a variant of the support member 26 of the embodiment of FIGS. 5–6. One difference between the two is that the distance between upper and lower surfaces 522, 524, respectively, is less than the distance between upper and lower sides 38, 40, respectively of member 26. Another difference is that each support member 502 is provided with a spatular-shaped stiff rib 526 which is disposed over its upper surface, as is most clearly shown in FIG. 7. Ribs 526 define a fairly large bearing surface which bearing surface engages the inner surface of panel 4 upon inserting the support member 504 to board 2, as will be more fully explained hereinafter. The support members 502 and the connecting member 504 are formed substantially perpendicular to one another and the support members 502 are mounted within board 2 in substantially the same manner as described with respect to assembly 400 of the embodiments of FIGS. 5 and 6.

It will be understood that to facilitate insertion of support members 502 through the corresponding apertures of board 2, the stiffening ribs 526 thereof are provided with chamfers 528 at their front ends. Similarly, the front ends 530 of the contact surfaces 518 are rounded to facilitate insertion of the support members. In addition, the overall height of each support member 502 is smaller than the height of cell 20, which also facilitates insertion.

Upon mounting the plural support member 502 to board 2, the contact surfaces 518 and the stiffening ribs 526 of the plural members 502 jam or wedge panel 4 positioned therein between, such that the compression forces or moments acting on assembly 500 are substantially received by the contact surfaces 516. Tensile forces are received by the bearing surfaces of stiffening ribs 526. Additionally, the region 532 defining the junction of the connection between support member 502 and connecting member 504 is preferably provided with a cross-sectional configuration so as to improve support in a longitudinal direction of cells 20.

While the invention has been illustrated and described as embodied in a fixing device for fastening objects on hollow boards, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A fixing device for connecting objects to a hollow board having a plurality of spaced cells defined by transversely spaced first and second panels which are joined to one another through a plurality of spaced webs therein between, the fixing device comprising: a connecting member for fastening objects thereto; at least one elongated support member for disposing within said boards said support member, said support member having first and second opposed ends and said connecting member being arranged substantially perpendicular to one of said opposed ends, wherein a pull-out force acting on said connecting member due to said objects supported thereby is substantially received by said supporting member when said device is disposed in said board; and a holding member having a web, a pair of parallel spaced elongated leg members extending from said web, said connecting member having a plate-like shape with a pair of parallel spaced slots therein, said slots being adapted to matingly receive said pair of leg members of the holding member therein.

2. A fixing device as recited in claim 1, wherein said pair of leg members comprise a rectangular shape, said pair of slots having a rectangular shape complementary to said shape of the pair of leg members.

3. A fixing device as recited in claim 1, wherein said connecting member comprises first and second opposed side surfaces, one of said first and second side surfaces having a pair of parallel spaced elongated raised rib members thereon, each one of said rib members being positioned adjacent a corresponding slot of said pair of slots, such that said each one of the rib members bears on a corresponding leg of said pair of leg members, when said pair of legs are matingly inserted within said pair of slots.

4. A fixing device as recited in claim 1, wherein said each leg of said pair of legs of the holding member comprises first and second side surfaces, one of said first and second side surfaces having a locking member projecting therefrom, and said locking member being adapted to abuttingly engage said connecting member, said connecting member having opposed side surfaces, one of said opposed side surfaces being adapted to abuttingly engage said locking member when said legs of the holding member are matingly received by said pair of parallel spaced slots.

5. A fixing device as recited in claim 1, wherein said connecting member has first and second opposed sides, a portion of said first side having raised contact surfaces, said contact surfaces extending in a longitudinal direction between opposed lateral end sides defined by said connecting member, and wherein said first panel of said hollow board comprises opposed side surfaces, said first panel being provided with at least one aperture for receiving a corresponding one of said at least one support member therein, said contact surface being disposed on said first surface of said connecting member so as to overlie said aperture of said first panel, when said connecting member is disposed through said apertures, and wherein a distance between outer extremities of said contact surfaces and said first side of said connecting member is substantially equal to a distance between said opposed first and second sides of said first panel.

6. A fixing device as recited in claim 1, wherein said connecting member is connected substantially perpendicular to said first end of the support member, and a region defining a connection between said support member and said connecting member having a substantially perpendicular cross-sectional area.

* * * * *